United States Patent [19]

Nishihara et al.

[11] Patent Number: 5,432,137
[45] Date of Patent: Jul. 11, 1995

[54] PROCESS FOR PRODUCING A HIGHLY CRYSTALLINE, FINE α-ALUMINA POWDER

[75] Inventors: Akira Nishihara; Tadashi Nakamura; Hideshi Ajimura, all of Omiya; Motohiko Yoshizumi, Saitama, all of Japan

[73] Assignee: Mitsubishi Materials Corporation, Tokyo, Japan

[21] Appl. No.: 115,794

[22] Filed: Sep. 3, 1993

Related U.S. Application Data

[63] Continuation of Ser. No. 926,694, Aug. 10, 1992, abandoned.

[30] Foreign Application Priority Data

Feb. 28, 1992 [JP] Japan .................. 4-078158

[51] Int. Cl.⁶ .......................................... C04B 35/10
[52] U.S. Cl. .................................. 501/153; 501/128; 51/293; 51/308
[58] Field of Search .................. 51/293, 308, 309; 501/128, 153; 423/629

[56] References Cited

U.S. PATENT DOCUMENTS

| | | | |
|---|---|---|---|
| 3,443,895 | 5/1969 | Gitzen et al. | 423/626 |
| 3,865,599 | 2/1975 | Mansmann et al. | 501/128 |
| 4,499,193 | 2/1985 | Phelps et al. | 501/128 |
| 4,568,363 | 2/1986 | Meloon | 51/293 |
| 4,786,292 | 11/1988 | Janz et al. | 51/293 |
| 4,799,938 | 1/1989 | Janz et al. | 51/309 |
| 4,918,874 | 4/1990 | Tiefenbach, Jr. | 51/293 |
| 4,960,738 | 10/1990 | Hori et al. | 501/128 |
| 5,089,456 | 2/1992 | Maeda et al. | 501/128 |

FOREIGN PATENT DOCUMENTS

| | | | |
|---|---|---|---|
| 0105025 | 4/1984 | European Pat. Off. | C01F 7/44 |
| 2651225 | 3/1991 | France . | |
| 63-045118 | 2/1988 | Japan | B24D 3/00 |
| 4260612 | 9/1992 | Japan | C01F 7/02 |

OTHER PUBLICATIONS

Gerhartz, *Ullmann's Encyclopedia*, 1985 (no month), vol. A-1 pp. 561-562.

*Primary Examiner*—Mark L. Bell
*Assistant Examiner*—Deborah Jones
*Attorney, Agent, or Firm*—James Creighton Wray

[57] ABSTRACT

A novel process for producing highly crystalline, fine α-alumina is disclosed. Aluminum hydroxide is calcined in the presence of fine silica powder. The obtained alumina is in the alpha form and has a specific surface area of least 10 m²/g.

10 Claims, No Drawings

PROCESS FOR PRODUCING A HIGHLY CRYSTALLINE, FINE α-ALUMINA POWDER

This application is a continuation of Ser. No. 926,694, filed Aug. 10, 1992, and now abandoned.

FIELD OF THE INVENTION

The present invention relates to a process for producing a highly crystalline, fine α-alumina powder (having an X-ray diffraction intensity of at least 7000 cps and a specific surface area of at least 10 m$^2$/g).

Fine α-alumina powder is used as a lapping powder for precise grinding and polishing in the production of aluminum disks and plastic lenses. It is also used as an anti-blocking agent for magnetic tapes because of its good dispersibility in resins. Fine α-alumina powder for these uses is required to have a high crystallinity. In the use as an abrasive material, for example, fine α-alumina powder having high crystallinity (an X-ray diffraction intensity of at least 7000 cps) and a specific surface area of at least 10 m$^2$/g are desired for more precise grinding and polishing.

BACKGROUND OF THE INVENTION

α-Alumina powder is conventionally produced by the Bayer process, which comprises neutralizing sodium aluminate with an acid to give aluminum hydroxide and calcining it at an elevated temperature of 1200° C. or higher. Since the obtained alumina has an uneven particle size and a specific surface area of smaller than 10 m$^2$/g and since sintering of particles occurs during the calcining, fine α-alumina powder can not be obtained. There is another process known for producing α-alumina powder, which comprises hydrolyzing aluminum alkoxide, e.g. aluminum isopropoxide, to give aluminum hydroxide and heating it at a high temperature. The obtained α-alumina powder has a surface area of less than 10 m$^2$/g, that is, desired fine α-alumina powder can not be obtained.

The abrasiveness or grinding property of alumina particles is exhibited by high hardness of α-alumina free of γ-alumina. Owing to its low hardness, γ-alumina can not be used as an abrasive material. In the present invention, the term α-alumina is used as a general term including δ-, γ-, θ- and κ-alumina, which are produced at low temperatures and which are determined by X-ray diffraction analysis. To have superior abrasiveness, α-Alumina particles are required to have high crystallinity in addition to being α-alumina. Therefore, even if particles are recognized by X-ray diffraction as being composed of α-alumina alone, they are poor in abrasiveness unless the α-alumina has a high X-ray diffraction intensity. Preferably, they should have an X-ray diffraction intensity of at least 7000 cps at mirror plane index (113). By conventional manufacturing processes, it was difficult to produce fine α-alumina powder having a specific surface area greater than 10 m$^2$/g and a high crystallinity in terms of X-ray diffraction intensity of at least 7000 cps.

The production of α-alumina powder from γ-alumina powder or aluminum hydroxide powder usually involves calcination of the starting material powder at 1150°-1300 ° C. In general, calcination at a higher temperature is necessary to yield a powder having a high crystallinity. However, calcination at a higher temperature causes powder particles to sinter forming coarse particles. Therefore, calcination at a lower temperature is desirable to yield a fine powder. In this case, however, the resulting α-alumina powder has a low crystallinity.

For example, calcination of aluminum hydroxide powder at about 1150° C. gives a fine α-alumina powder having a specific surface area of about 30 m$^2$/g. However, this powder has a low crystallinity in terms of X-ray diffraction intensity of about 6000 cps, and it also contains γ-alumina other than α-alumina in a large quantity. On the other hand, the calcination temperature of about 1200° C. increases the crystallinity of the resulting alumina to about 11550 cps in the X-ray diffraction intensity but decreases the specific surface area to about 7.0 m$^2$/g.

Prior to the present invention, the present inventors found that it is possible to produce a fine α-alumina powder having a high crystallinity, if a γ-alumina powder obtained by the dry process is calcined together with a small amount of fine silica powder. A production process based on this finding is the subject of Japanese Patent Application No. 219860/1989. Continued research led to a finding that calcining aluminum hydroxide containing fine silica powder uniformly dispersed therein gives a fine α-alumina powder having a high crystallinity. Especially, it was found that aluminum hydroxide precipitate obtained by hydrolysis of aluminum chloride and the like in the presence of silica powder uniformly dispersed in the solution produces fine α-alumina powder having a high crystallinity by calcination. The thus obtained alumina powder has a better dispersibility in water than the alumina obtained by calcination of γ-alumina.

SUMMARY OF THE INVENTION

The present invention provides a process for producing a highly crystalline, fine α-alumina powder having a specific surface area of at least 10 m$^2$/g, said process comprising calcining at 1170°-1350° C. aluminum hydroxide in which 0.5-10 wt%, based on the weight of aluminum oxide, of fine silica is uniformly dispersed.

Specifically, the present invention provides a process for producing a highly crystalline, fine α-alumina powder having a specific surface area of at least 10 m$^2$/g, comprising uniformly dispersing fine silica powder in an amount of 0.5-10 wt%, preferably 0.5-3.0 wt%, based on the weight of aluminum oxide in aluminum hydroxide precipitate, which is obtained by hydrolysis of aluminum chloride and calcining it at 1170°-1350 ° C.

Also the present invention provides a process for producing fine α-alumina powder having, a high crystallinity (X-ray diffraction intensity of 7000 cps or above) and a specific surface area of at least 10 m$^2$/g. Specifically, a fine α-alumina having a high crystallinity is advantageously produced by a process comprising uniformly dispersing fine silica powder in an aqueous solution of aluminum chloride hydrolyzing aluminum chloride, drying the obtained aluminum hydroxide precipitate and finally calcining the precipitates at 1170°-1350 ° C.

When aluminum hydroxide is calcined in the presence of a small amount of silica, aluminum hydroxide is directly converted into α-alumina, although the reason is not yet clearly understood.

In the present invention, anhydrous aluminum chloride, hexahydrate thereof and aluminum dissolved in hydrochloric acid can be used as an aluminum chloride source. It will be understood by those skilled in the art that aluminum salts other than aluminum chloride, i.e.

such as aluminum sulfate, sodium aluminate, etc. can be used in the same manner as aluminum chloride.

In the present invention, alkali hydroxide, ammonium salt, aqueous ammonia solution and the like can be used as a neutralizer. Ammonium carbonate or ammonium hydrogen carbonate as a neutralizer provides finer s-alumina powder than other neutralizers. It seems that carbon dioxide gas generated during the hydrolysis acts advantageously when aluminum hydroxide precipitate is formed around silica as nuclei. Alkali metal tend to promote grain-growth. In the case where sodium hydroxide, etc. is used as a neutralizer, addition of more than 1.0 wt% silica powder, on the basis of the weight of aluminum oxide and calcination at 1200°–1250° C. are desirable.

Silica powder used in the present invention must have a specific surface area of theoretically not less than 10 $m^2/g$ practically more than 20–30 $m^2/g$. Commercially available so-called fumed silica powders have a specific surface area of 100 $m^2/g$ or more and can be suitably used in the process of the present invention. The silica should preferably have a specific surface area of not less than 200 $m^2/g$.

Silica powder is added in an amount of at least 0.5 wt%, based on the weight of aluminum oxide in aluminum hydroxide as a starting material. With an amount of less than 0.5 wt%, silica powder does not effectively prevent the growth of alumina powder grains, and hence it is impossible to produce a fine alumina powder having a specific surface area of at least 10 $m^2/g$. With an amount of 0.5–3.0 wt%, silica powder enables production of fine α-alumina powder having a specific surface area of 20–40 $m^2/g$ by calcination at 1170° C. for 6 hours.

With increase of addition of silica powder, the specific surface area of the resulting α-powder increases in specific surface area but decreases in X-ray diffraction intensity or crystallinity. Therefore, as the amount of silica powder is increased, it is necessary to raise the calcining temperature. If the amount of silica powder exceeds 10 wt%, the resulting powder will comprise mostly γ-alumina and it is difficult to obtain α-alumina, even if the calcination is performed at 1400° C. for 6 hours. Therefore, silica powder should be used in a range of 0.5–10 wt% according to the desired specific surface area and calcining temperature. In case where the amount of silica powder is larger than 3.0 wt%, calcination should be performed at about 1250° C. or higher so as to obtain an α-alumina powder having a high crystallinity in terms of X-ray diffraction intensity of greater than 7000 cps and also having a high fineness in terms of specific surface area greater than 10 $m^2/g$. Therefore, the amount of silica powder should preferably be used in an amount of 0.5–3.0 wt%, if an α-alumina powder having a high crystallinity is to be produced economically at a comparatively low calcining temperature of about 1250° C.

As described above, calcination of aluminum hydroxide at about 1170° C. or above is necessary for production of an α-alumina powder having a high crystallinity (in terms of X-ray diffraction intensity greater than 7000 cps) and a high fineness (in terms of specific surface area greater than 10 $m^2/g$). However, this calcination temperature may vary depending on the amount of silica powder added. The more the amount of silica powder added, the higher the calcining temperature. Table 1 shows the amount of silica powder and the corresponding calcining temperature, which were found experimentally.

TABLE 1

| Amount of $SiO_2$ (wt %) | Calcining Temperature (°C.) |
|---|---|
| 0.5–2.0 | 1170–1250 |
| 2.0–3.0 | 1180–1280 |
| 3.0–4.0 | 1200–1300 |
| 4.0–5.0 | 1200–1320 |
| 5.0–7.0 | 1220–1350 |
| 7.0–10.0 | 1250–1350 |

SPECIFIC DISCLOSURE OF THE INVENTION

The present invention is specifically described by way of Experiments and Examples.

α-Aluminum powders were prepared from aluminum hydroxide obtained by hydrolysis of aluminum chloride. Aluminum hydroxide was calcined without silica powder and with silica powder having a specific surface area of 100 $m^2/g$, in varied amounts of from 0.5 wt% to 10.0 wt% at different temperatures. The resulting alumina powders were examined for specific surface area and X-ray diffraction. The results are shown in Table 2. It is noted from Table 2 that at a given calcining temperature, the aluminum hydroxide calcined with silica powder forms fine α-alumina powder having a high specific surface area, in comparison with the aluminum hydroxide calcined without silica powder. It is considered that the added silica particles are uniformly dispersed in the aluminum hydroxide precipitate and present between the particles of aluminum hydroxide when aluminum hydroxide is calcined and thereby converts aluminum hydroxide directly into α-alumina and prevents grain growth of the α-alumina powder. From the aluminum hydroxide precipitate produced with fine silica dispersed in hydrolysis solution of aluminum chloride, the finer α-alumina powder having a very high crystallinity can be obtained. In the conversion to α-alumina by calcination of aluminum hydroxide, nuclei of α-alumina are first formed and then grow and promote the conversion.

If an aluminum chloride aqueous solution containing fine silica powder dispersed therein is hydrolyzed by addition of a neutralizer, aluminum hydroxide precipitate forms with silica a nuclei and grain growth of α-alumina is effectively prevented during calcination.

EXAMPLE 1

Eighty-nine grams (89 g) of commercially available aluminum chloride powder was dissolved in 300 g of water to give an aqueous solution of aluminum chloride, and 108 g of commercially available ammonium carbonate was dissolved in 1000 ml of water to give an aqueous solution of ammonium carbonate. The aluminum .mb3 chloride solution was added dropwise to the ammonium carbonate solution to form a precipitate, which was subsequently separated from the liquid. To the precipitate was added 0.3 g of silica powder ("Aerosil No. 200" manufactured by Nippon Aerosil Co., Ltd.). After thorough mixing, the mixture was dried at 120° C. The dried mixture was calcined in an alumina crucible at 1200° C. for 6 hours in an electric furnace. The calcined powder was examined for X-ray diffraction. The X-ray diffraction pattern has only one peak representing α-alumina, with an intensity of 9500 cps. The powder was found to have a specific surface area of 20 $m^2/g$.

COMPARATIVE EXAMPLE 1

The same procedure as in Example 1 was repeated to give alumina powder, except that silica powder was not added. The powder gave an X-ray diffraction pattern which has only one peak representing α-alumina. However, the powder was found to have a specific surface area as low as 7.5 m²/g.

EXAMPLES 2 TO 10 AND COMPARATIVE EXAMPLES 2 TO 4

Into an aqueous solution each containing an aluminum salt shown in Table 3 was uniformly dispersed silica powder. To the aqueous solution was further added a required amount of a neutralizer to give a precipitate. After separation from the liquid, the precipitate was washed, dried for one day, and calcined. The calcined powder was tested for specific surface area and X-ray diffraction. The results are shown in Table 3.

COMPARATIVE EXAMPLE 5

To 100 g of alumina powder ("Aluminum Oxide C" supplied by DEGUSSA), which was produced by the reaction of aluminum trichloride and steam in oxyhydrogen flame, 0.5–3.0 g of silica ("Aerosil No. 200" manufactured by Nippon Aerosil Co., Ltd.) was added as indicated in Table 4. After thorough mixing, the mixture was kneaded with 250 g of an aqueous solution containing 2.5 g of polyvinyl alcohol, was dried at 110° C. and the obtained powder was sieved as being lightly crushed and pulverized to a fineness of 100–200 μm. The obtained fine powder was calcined for 6 hours at temperatures shown in Table 4, lightly crushed and finally was examined for specific area and X-ray diffraction. The test results are shown in Table 4.

EXAMPLE 11

Three hundred grams (300 g) of the α-alumina powder produced in the same procedure as in Example 1 with 1% silica dispersed therein was added to 1.5 liter of water. The resultant mixture was treated for about 3 minutes by a bead mill (manufactured by Willy A. Bachofen Co.) to well disperse the α-alumina powder in water. On the other hand, 300 g of the α-alumina powder obtained in Comparative Example 5 with addition of 1% silica was added to 1.5 liter of water, and was treated for 3 minutes by the above-mentioned bead mill to obtain another dispersion. After the each of the above dispersions was allowed to stand for about one month, the powder of Comparative Example 5 settled in a liquid forming two layers. On the other hand, the dispersion of the powder of Example 1 did not settle and the excellent dispersion was maintained for a long term.

TABLE 2

| Calcining Temperature (°C.) | Amount of $SiO_2$ (wt %) | Specific Surface Area (m²/g) | X-ray Diffraction Intensity (cps) |
| --- | --- | --- | --- |
| 1150 | 0.0 | 29.6 | 6620 |
|  | 0.5 | 39.1 | 5020 |
|  | 1.0 | 48.6 | 3420 |
|  | 2.0 | 51.5 | 2670 |
|  | 3.0 | 66.1 | 2240 |
| 1170 | 0.5 | 20.8 | 9300 |
|  | 2.0 | 34.4 | 7200 |
| 1200 | 0.0 | 7.0 | 11550 |
|  | 0.5 | 12.7 | 10530 |
|  | 1.0 | 18.3 | 9510 |
|  | 2.0 | 25.0 | 8340 |
|  | 3.0 | 28.8 | 6950 |
| 1250 | 0.0 | 4.4 | 13900 |
|  | 0.5 | 10.2 | 12080 |
|  | 1.0 | 13.3 | 10260 |
|  | 2.0 | 13.5 | 10260 |
|  | 3.0 | 16.7 | 9300 |
| 1350 | 7.0 | 15.0 | 8500 |
|  | 10.0 | 25.8 | 7580 |

TABLE 3

| Example No. (Comparative Example No.) | Aluminum salt | Amount of $SiO_2$ (wt %) | Neutralizer | Calcining temperature (°C.) | Specific surface area (m²/g) | X-ray diffraction intensity (cps) |
| --- | --- | --- | --- | --- | --- | --- |
| 2 | $AlCl_3$ | 1.0 | $NH_4HCO_3$ | 1170 | 32.0 | 7500 |
| 3 | $AlCl_3 \cdot 6H_2O$ | 1.0 | NaOH | 1250 | 15.0 | 9000 |
| 4 | $AlCl_3$ | 2.0 | $NH_4HCO_3$ | 1180 | 28.0 | 7700 |
| 5 | Al + HCl | 2.0 | $NH_4CO_3$ | 1280 | 15.1 | 9000 |
| 6 | $AlCl_3$ | 1.0 | $(NH_4)_2CO_3$ | 1200 | 24.0 | 8300 |
| 7 | $AlCl_3$ | 1.0 | NaOH + $(NH_4)_2SO_4$ | 1180 | 16.0 | 9000 |
| 8 | $AlCl_3$ | 4.0 | $NH_4HCO_3$ | 1320 | 15.0 | 8900 |
| 9 | Al + HCl | 6.0 | $NH_4OH$ | 1340 | 15.0 | 9200 |
| 10 | $Al(OH)_3$ | 0.5 | — | 1200 | 13.0 | 9400 |
| (2) | $AlCl_3$ | 0.0 | NaOH | 1200 | 8.0 | 10600 |
| (3) | $AlCl_3$ | 10.0 | $(NH_4)_2CO_3$ | 1400 | 40.0 | 5500 |
| (4) | $AlCl_3 \cdot 6H_2O$ | 0.0 | $NH_4HCO_3$ | 1050 | 45.0 | 5000 |

TABLE 4

| Calcining Temperature (°C.) | Amount of $SiO_2$ (wt %) | Specific Surface Area (m²/g) | X-ray Diffraction Intensity (c.p.s.) |
| --- | --- | --- | --- |
| 1200 | 0.0 | 8.0 | 10600 |
|  | 0.5 | 8.3 | 10120 |
|  | 1.0 | 9.2 | 9200 |
|  | 2.0 | 18.5 | 8700 |
|  | 3.0 | 21.8 | 7750 |

What we claim is:

1. A process for producing a highly crystalline, fine α-alumina powder having a specific surface area of at least 10 m²/g, said process comprising calcining at 1170°–1350° C. aluminum hydroxide in which 0.5–10 wt%, based on the weight of aluminum oxide to be formed, of fine silica powder having a specific surface area of larger than 10 m²/g is uniformly dispersed.

2. The process as defined in claim 1, wherein 0.5–3.0 wt%, based on the weight of aluminum oxide to be formed, of fine silica powder is dispersed.

3. The process as defined in claim 1, wherein said silica powder has a specific surface area of at least 100 m²/g.

4. A process for producing a highly crystalline, fine α-alumina powder having a specific surface area of at least 10 m²/g, said process comprising uniformly mixing a fine silica powder having a specific surface area larger than 10 m$^2$/g in an amount of 0.5–10 wt%, based on the weight of aluminum oxide to be formed, in an aluminum hydroxide precipitate formed by hydrolysis of aluminum chloride and calcining the precipitate at 1170°–1350° C.

5. The process as defined in claim 4, wherein said fine silica powder is in an amount of 0.5–3.0 wt%, based on the weight of aluminum oxide to be formed.

6. The process as defined in claim 4, wherein said silica powder has a specific surface area of at least 100 m$^2$/g.

7. A process for producing a highly crystalline, fine α-alumina powder having a specific surface area of at least 10 m$^2$/g, said process comprising preparing an aqueous aluminum chloride solution in which fine silica powder having a specific surface area larger than 10 m$^2$/g is uniformly dispersed in an amount of 0.5–10 wt%, based on the weight of aluminum oxide to be formed, hydrolyzing the aluminum chloride to form aluminum hydroxide precipitate containing silica powder, recovering the precipitate, and calcining the precipitates at 1170°–1350° C.

8. The process as defined in claim 7, wherein said fine silica powder is in an amount of 0.5–3.0 wt%, based on the weight of aluminum oxide to be formed.

9. The process as defined in claim 7, wherein said silica powder has a specific surface area of at least 100 m$^2$/g.

10. The process as defined in claim 7, wherein aluminum chloride is hydrolyzed with ammonium carbonate or ammonium hydrogen carbonate.

* * * * *